United States Patent
Peel et al.

(10) Patent No.: US 11,473,875 B2
(45) Date of Patent: *Oct. 18, 2022

(54) WEAPON SIGHTED CAMERA SYSTEM

(71) Applicant: Tactacam LLC, Caledonia, MN (US)

(72) Inventors: Jeff Peel, Decorah, IA (US); Garrison Peel, Caledonia, MN (US)

(73) Assignee: TACTACAM LLC, Caledonia, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,835

(22) Filed: Apr. 13, 2020

(65) Prior Publication Data

US 2021/0010782 A1 Jan. 14, 2021

Related U.S. Application Data

(63) Continuation of application No. 16/131,690, filed on Sep. 14, 2018, now Pat. No. 10,619,976.

(Continued)

(51) Int. Cl.

| | |
|---|---|
| *F41G 3/14* | (2006.01) |
| *F41G 3/22* | (2006.01) |
| *F41G 3/26* | (2006.01) |
| *F41G 3/16* | (2006.01) |
| *F41G 3/08* | (2006.01) |
| *H04N 5/225* | (2006.01) |

(Continued)

(52) U.S. Cl.
CPC .............. *F41G 3/165* (2013.01); *F41G 3/08* (2013.01); *F41G 3/22* (2013.01); *F41G 3/225* (2013.01); *F41G 3/323* (2013.01); *G02B 27/0172* (2013.01); *H04N 5/2253* (2013.01); *G02B 2027/0138* (2013.01); *G02B 2027/0141* (2013.01); *G02B 2027/0178* (2013.01)

(58) Field of Classification Search
CPC .......... F41G 3/165; F41G 3/225; F41G 3/323; F41G 3/08; F41G 3/22; G02B 27/0172; G02B 2027/0141; G02B 2027/0178; H04N 5/2253

See application file for complete search history.

(56) References Cited

U.S. PATENT DOCUMENTS

| | | | | |
|---|---|---|---|---|
| 3,785,261 A | * | 1/1974 | Ganteaume | F41J 5/10 346/107.2 |
| 5,026,158 A | | 6/1991 | Golubic | |

(Continued)

FOREIGN PATENT DOCUMENTS

| | | | | |
|---|---|---|---|---|
| EP | 2701816 A2 | * | 3/2014 | ........... A63F 13/213 |
| WO | WO-2017087583 A1 | * | 5/2017 | .............. F41C 27/00 |

OTHER PUBLICATIONS

Notification of Transmittal of The International Search Report and The Written Opinion of The International Searching Authority, or The Declaration, in PCT/US2018/051093, dated Nov. 14, 2018 (12 pages).

(Continued)

*Primary Examiner* — Philip P. Dang
(74) *Attorney, Agent, or Firm* — McAndrews, Held & Malloy, Ltd.

(57) ABSTRACT

Systems, apparatuses, and methods are described which provide weapon sighted cameras. A camera can be mounted on a weapon and, after a set-up procedure, can acquire a target without using a weapon sight of the weapon.

17 Claims, 3 Drawing Sheets

Related U.S. Application Data

(60) Provisional application No. 62/559,429, filed on Sep. 15, 2017.

(51) Int. Cl.
  G02B 27/01 (2006.01)
  F41G 3/32 (2006.01)

(56) References Cited

U.S. PATENT DOCUMENTS

| | | | | |
|---|---|---|---|---|
| 5,686,690 | A * | 11/1997 | Lougheed | F41A 17/08 89/134 |
| 5,711,104 | A | 1/1998 | Schmitz | |
| 5,824,942 | A * | 10/1998 | Mladjan | F41G 3/165 42/105 |
| 5,887,375 | A * | 3/1999 | Watson | G03B 29/00 42/106 |
| 6,237,462 | B1 | 5/2001 | Hawkes | |
| 6,598,329 | B1 | 7/2003 | Alexander | |
| 6,813,025 | B2 * | 11/2004 | Edwards | F41G 1/38 359/399 |
| 7,377,704 | B2 * | 5/2008 | Moulton | B60R 11/04 396/419 |
| 7,787,012 | B2 * | 8/2010 | Scales | A63F 13/245 348/158 |
| 8,046,951 | B2 * | 11/2011 | Peters | F41G 3/08 42/114 |
| 8,282,493 | B2 * | 10/2012 | Roman | F41G 3/165 463/2 |
| 8,485,085 | B2 | 7/2013 | Goree | |
| 8,587,659 | B1 | 11/2013 | Socolinsky | |
| 8,817,103 | B2 * | 8/2014 | Scales | A63F 13/53 348/158 |
| 9,010,002 | B2 * | 4/2015 | Popa-Simil | F41A 25/00 42/1.06 |
| 9,021,934 | B1 * | 5/2015 | Hagerty | F41G 3/14 89/41.05 |
| 9,068,795 | B2 * | 6/2015 | Roman | F41G 3/06 |
| 9,121,671 | B2 * | 9/2015 | Everett | F41G 3/165 |
| 9,127,911 | B2 * | 9/2015 | Varshneya | G01S 17/95 |
| 9,157,701 | B2 * | 10/2015 | Varshneya | F41G 3/06 |
| 9,217,866 | B2 * | 12/2015 | Scales | G02B 27/01 |
| 9,229,230 | B2 * | 1/2016 | Scales | G06V 10/751 |
| 9,310,163 | B2 * | 4/2016 | Bay | F41G 1/473 |
| 9,331,495 | B2 * | 5/2016 | Soar | H04K 3/827 |
| 9,335,120 | B2 * | 5/2016 | Roman | F41G 3/06 |
| 9,347,742 | B2 * | 5/2016 | Varshneya | F41G 3/165 |
| 9,518,804 | B2 * | 12/2016 | Hamilton | G01S 17/10 |
| 9,683,813 | B2 * | 6/2017 | Beckman | F41G 1/46 |
| 9,766,040 | B2 * | 9/2017 | Roman | F41G 3/165 |
| 9,829,279 | B1 * | 11/2017 | Sieracki | F41G 3/16 |
| 9,835,413 | B2 * | 12/2017 | McDonald | F41G 3/02 |
| 9,874,426 | B2 * | 1/2018 | Winker | F42B 33/001 |
| 10,101,125 | B2 | 10/2018 | Conklin | |
| 10,114,127 | B2 * | 10/2018 | Brown | G06F 3/04842 |
| 10,139,629 | B2 * | 11/2018 | Scales | G02B 27/017 |
| 10,146,051 | B2 * | 12/2018 | Alsheuski | F41G 1/38 |
| 10,203,762 | B2 * | 2/2019 | Bradski | H04N 21/414 |
| 10,209,035 | B2 * | 2/2019 | Beckman | F41G 3/165 |
| 10,216,065 | B2 * | 2/2019 | Stern | H04N 5/2254 |
| 10,267,597 | B2 * | 4/2019 | Olmsted | G02B 27/0101 |
| 10,401,497 | B2 * | 9/2019 | Winker | G01S 17/66 |
| 10,408,574 | B2 * | 9/2019 | Guthrie | F41G 3/165 |
| 2005/0233284 | A1 * | 10/2005 | Traykov | F41G 3/2611 434/16 |
| 2006/0005447 | A1 * | 1/2006 | Lenner | F41G 3/06 42/111 |
| 2006/0121993 | A1 * | 6/2006 | Scales | A63F 13/213 463/48 |
| 2007/0238073 | A1 * | 10/2007 | Portoghese | G01S 5/163 434/21 |
| 2008/0136916 | A1 * | 6/2008 | Wolff | H04N 5/23293 348/169 |
| 2009/0040308 | A1 * | 2/2009 | Temovskiy | F41G 3/16 382/296 |
| 2009/0133572 | A1 * | 5/2009 | Izraeli | F41G 1/54 348/E7.091 |
| 2010/0007580 | A1 * | 1/2010 | Scales | F41G 3/165 345/8 |
| 2010/0258000 | A1 * | 10/2010 | Hagerty | F41G 3/165 89/41.05 |
| 2012/0097741 | A1 * | 4/2012 | Karcher | F41G 1/473 235/404 |
| 2013/0333266 | A1 * | 12/2013 | Gose | F41G 1/30 348/340 |
| 2016/0245621 | A1 * | 8/2016 | Kintzing | F41G 11/003 |
| 2016/0252325 | A1 * | 9/2016 | Sammut | G01S 19/13 42/122 |
| 2017/0261289 | A1 * | 9/2017 | Lasco | F41G 1/473 |
| 2017/0284771 | A1 * | 10/2017 | Roman | F41G 1/473 |
| 2017/0363391 | A1 | 12/2017 | Conklin | |
| 2018/0224230 | A1 * | 8/2018 | Myers | F41J 5/10 |

OTHER PUBLICATIONS

Intellectual Property Office of Singapore, Written Opinion dated Mar. 22, 2021, for Patent Application No. 11202002344X, Title: Weapon Sighted Camera System.

Ntellectual Property Office of Singapore, Written Opinion dated Nov. 24, 2021, for Patent Application No. 11202002344X, Title: Weapon Sighted Camera System.

* cited by examiner

FIG.. 2A
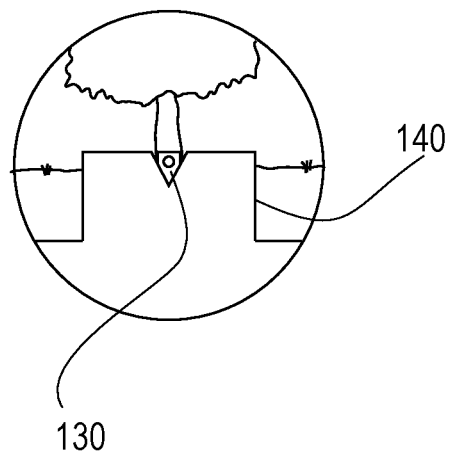
140
130
FIG. 2B
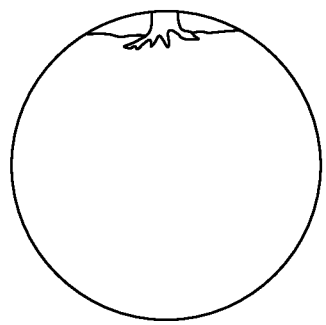
FIG. 2C
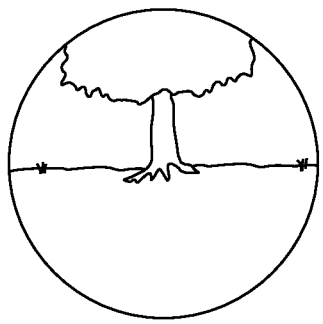
FIG. 3A
190
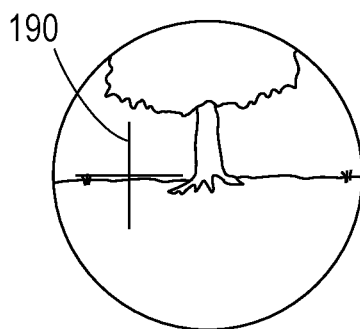
FIG. 3B
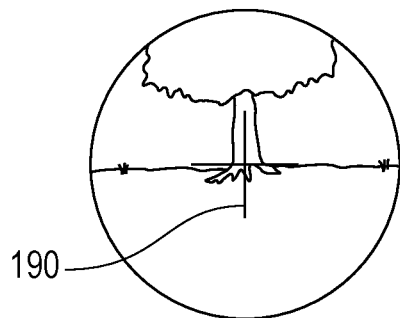
190

WEAPON SIGHTED CAMERA SYSTEM

CROSS-REFERENCE TO RELATED APPLICATIONS

The present application is a continuation of U.S. application Ser. No. 16/131,690, filed Sep. 14, 2018, which claims benefit from and priority to U.S. Application No. 62/559,429, filed Sep. 15, 2017. The above-identified applications are hereby incorporated by reference herein in their entirety.

BACKGROUND

Conventional weapon sights require the operator to peer through the sights on the weapon to aim the weapon at a target. However, the act of peering through the sights and aiming the weapon can expose the operator. For example, a hunter hiding behind a tree might need to come out of hiding in order to aim the weapon at a deer, thereby alerting the deer to the presence of the hunter and causing the deer to flee.

Further limitations and disadvantages of conventional and traditional approaches will become apparent to one of skill in the art, through comparison of such systems with the present disclosure as set forth in the remainder of the present application with reference to the drawings.

BRIEF SUMMARY

Systems, apparatuses, and methods provide weapon sighted cameras substantially as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

FIG. 2A shows an embodiment of a weapon sight view according to the present disclosure.

FIG. 2B shows an embodiment of a camera view before adjustments according to the present disclosure.

FIG. 2C shows an embodiment of the camera view after adjustments according to the present disclosure.

FIG. 3A shows an embodiment of a camera view before adjusting the digital reticle according to the present disclosure.

FIG. 3B shows an embodiment of the camera view after adjusting the digital reticle according to the present disclosure.

DETAILED DESCRIPTION

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments according to the present disclosure relate to systems, apparatuses, and methods that provide weapon sighted cameras.

Some embodiments according to the present disclosure provide a camera image transmission system that works in conjunction with a display (e.g., a helmet display, a heads-up display, a heads-up display on goggles or glasses, a wearable display, a watch display, a handheld display, etc.).

Some embodiments according to the present disclosure provide a camera image transmission system that is operated in conjunction with a weapon (e.g., a rifle, a gun, a bow, etc.). In such instances, the weapon can be aimed without the operator looking directly through the sights of the weapon.

Figure 1A:
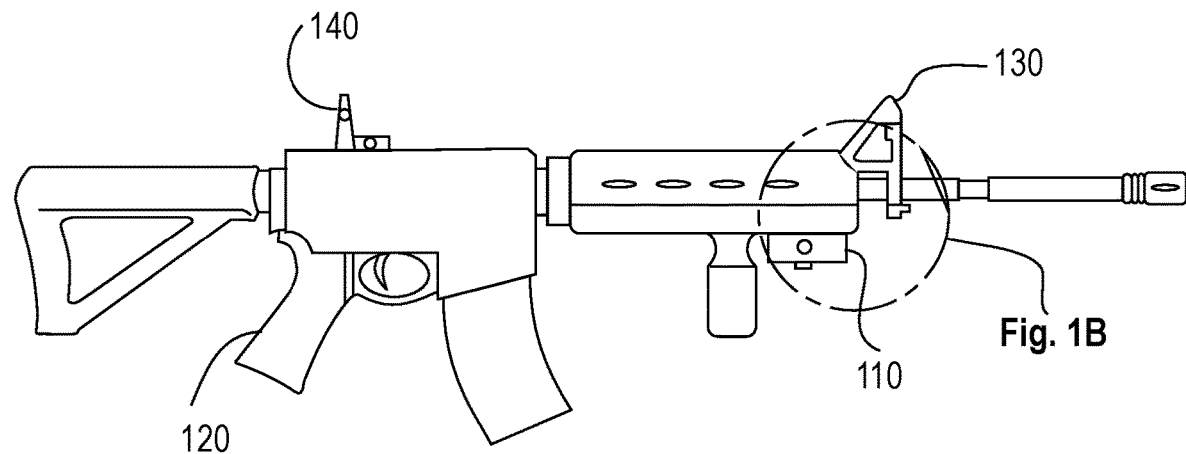
FIG. 1A shows an embodiment of a camera mounted on a weapon according to the present disclosure.
Figure 1B:
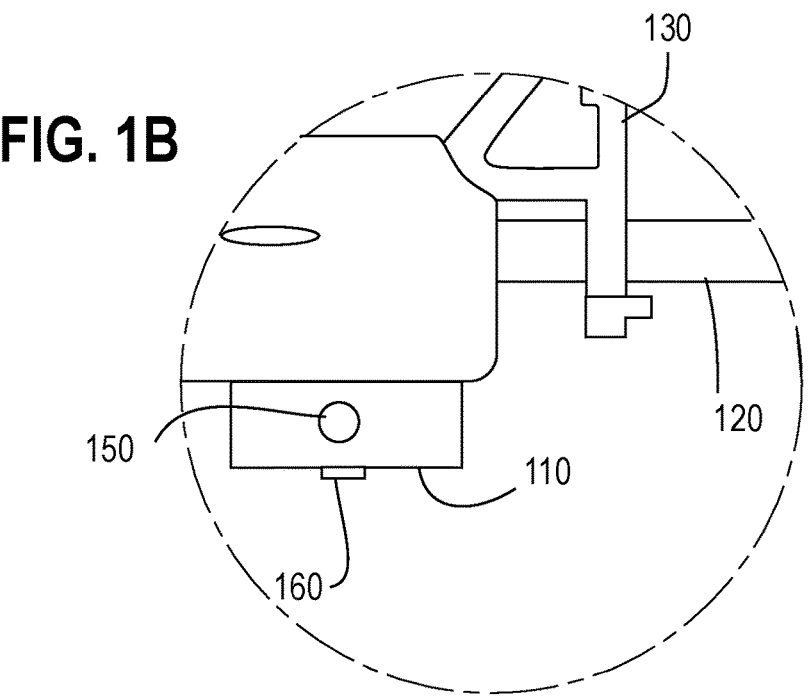
FIG. 1B shows a magnified view of the camera mounted on the weapon shown in FIG. 1A.

FIGS. 1A-B show an embodiment of a camera 110 mounted on a weapon 120 according to the present disclosure. Referring to FIG. 1A, the weapon 120 is shown as a rifle that has a front sight post 130 and a rear sight post 140. The camera 110 has two types of adjustments. Referring to FIG. 1B, which is an inset of FIG. 1A, the camera 110 includes a manual windage adjustment that is facilitated by a turret 150 or a screw on a side of the camera 110. The turret 150 is configured such that when turned clockwise or counter-clockwise, the camera 110 can be adjusted horizontally (e.g., side to side, right to left, left to right, etc.). The camera 110 also includes a manual elevation adjustment that is facilitated by a turret 160 or a screw on a bottom of the camera 110. The turret 160 is configured such that when turned clockwise or counter-clockwise, the camera 110 can be adjusted vertically (e.g., upwards, downwards, etc.).

In operation according to some embodiments, the camera 110 is manually sighted into the weapon. The camera 110 can have a display to display the camera view. In some embodiments, the display can be separate from the camera 110. For example, the camera 110 can provide, via wired and/or wireless link, the camera view to a display on a handheld device (e.g., a smartphone, an computing tablet, etc.) or on a wearable device (e.g., glasses or helmets with heads-up displays). Accordingly, the weapon 120 can be aimed at a particular target (e.g., a particular aim point of the weapon) by using the camera view shown on the display (e.g., a heads-up display) instead of using the weapon sights 130, 140. Thus, the user of the weapon 120 can acquire a target without even shouldering the weapon 120. The camera view shown on the display effectively becomes the weapon sights when being pointed around corners, for example.

FIGS. 2A-C and 3A-B show exemplary embodiments for setting up the camera 110 in conjunction with the weapon 120. In some embodiments, after the weapon 120 has been zeroed, the camera 110 can be set up. To set up the weapon 120 and the camera 110, the weapon 120 is placed on a steady platform or held in place (e.g., by a vice) so that the sights can be held on a target. Referring to FIG. 2A, the weapon sight view is shown including the rear sight posts 140 and the front sight post 130. As illustrated, the weapon has an aim point at the base of a tree, for example.

Some embodiments provide a handheld or wearable device that includes one or more processors and one or more memories (e.g., one or more non-transitory computer readable media). The handheld or wearable device can also include a display (e.g., a heads-up display on glasses, a helmet, a cap, goggles, etc.) that is operatively coupled to the one or more processors. The one or more processors can run an application (e.g., code, instructions, etc.) that communicates with the camera 120 to provide the camera view on the display. The communications can be via a wired link (e.g., a cable, a wire, etc.) and/or a wireless link (e.g., cellular, WiFi, Bluetooth, wireless local area network, personal area network, WiMax, satellite, infrared, radio, etc.). The device and the camera 110 can include, for example, processors, transceivers, and/or antennas to effect such communications. For example, the camera 110 can include, for example, an image transmission system for transmitting images (e.g., frames, video, etc.) to the handheld or wearable device. Although some embodiments provide that the display is separate from the camera 110, some embodiments provide that the display is part of the camera 110 (e.g., the display can be on rear or other surface of the camera 110), or provide that there are multiple displays that can be used such as one on the camera 110 and one on the handheld or wearable device, for example.

Referring to FIGS. 2B-C, the application in the handheld or wearable device and/or the camera 110 is opened or initiated so that communications is established between the handheld or wearable device and the camera 110. The camera 110 transmits its camera view to the handheld or wearable device which, in turn, displays the camera view on its display as shown in FIG. 2B. Referring to FIG. 2B, because the camera 110 has not been properly aligned, the camera view is different than the weapon sight view. As illustrated, only a bottom portion of the tree is shown at the top of the camera view, for example. Some embodiments provide that the camera 110 does not actually look down the sights 130, 140 of the weapon as is the case in FIGS. 2B-C since the weapon sights 130, 140 are not in the camera view. However, some embodiments do contemplate that the camera 110 does look down the weapon sights 130, 140.

Referring to FIG. 2C, the camera view can be adjusted by adjusting the position of the camera 110 relative to the weapon 120. In some embodiments, by turning the turrets 150, 160, the user can manually make windage and elevation adjustments until the camera view is the same or similar to the view through the weapon sights.

Referring to FIGS. 3A-B, some embodiments provide that, once the manual windage and elevation adjustment to the camera 110 have been completed, the digital reticle (e.g., digital cross hairs) on the camera view can be adjusted. Via a user interface (e.g., buttons, dials, graphical user interface, graphical elements, etc.) on the camera 110 or the handheld or wearable device, the digital reticle can be caused to appear on the display and adjusted (e.g., digitally moved on the display) to the center of the camera view on the display or to a particular point (e.g., the aim point of the weapon 120) on the camera view of the display. Some embodiments provide that the crosshairs on the camera can be adjusted using the application to mirror the aim point of the weapon 120. Now that the camera is properly aligned, the weapon 120 can be removed from the steady platform and used in the field (e.g., outdoors, target range, etc.) using the camera view instead of the weapon sights.

Figure 4:
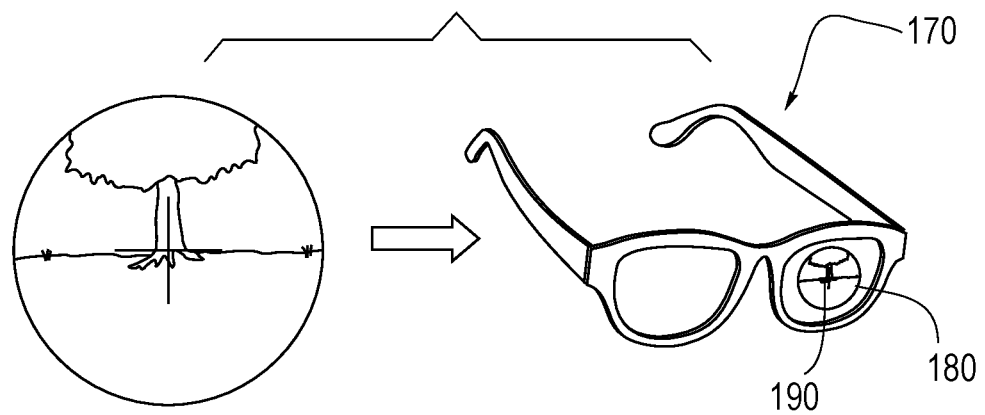
FIG. 4 shows an embodiment of a camera system that employs a heads-up display on glasses according to the present disclosure.

FIG. 4 shows an embodiment of the handheld or wearable device in the form of glasses 170 that provide a heads-up display 180. Some embodiments provide that some of the components and/or circuitry that receive the camera view from the camera 110, process the received data from the camera 110 for display, and/or provide other capabilities or functions may be located separately from the glasses 170 and may be operatively coupled to the glasses 170 via a wired and/or wireless link. Some embodiments provide that the glasses 170 includes all the subsystems to provide the heads-up display and/or other capabilities or functions.

Referring to FIG. 4, some embodiments provide that the camera 110 sends data (e.g., information) to the glasses 170 which provides the camera view on a heads-up display 180. Some embodiments provide that the camera 110 sends the camera view to the glasses 170 via a Bluetooth or WiFi connection. In an exemplary embodiment, the heads-up display appears or is part of one of the lenses of the glasses 170. Thus, in operation, the user can aim the weapon 120 using the reticle 190 on the heads-up display 180 instead of looking through the weapon sights 130, 140.

Figure 5:
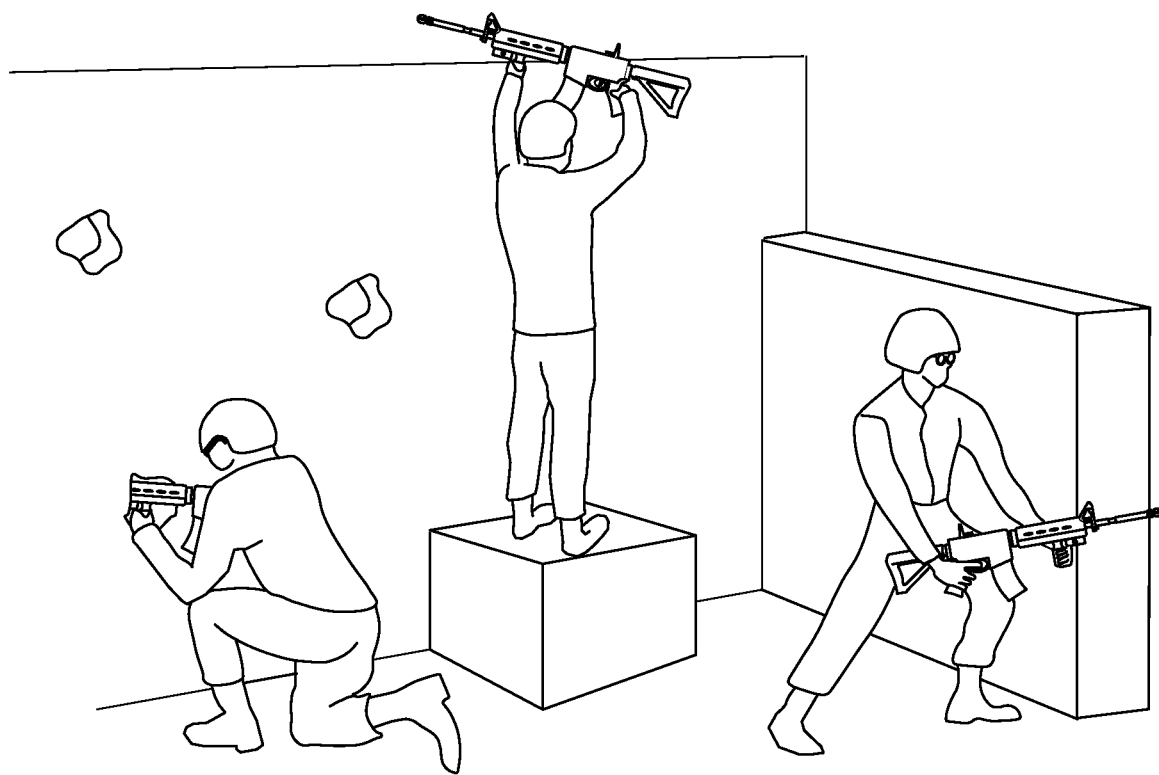
FIG. 5 shows a user using the camera view to aim and fire at a target from behind a wall or from within a hideout according to an embodiment of the present disclosure.

FIG. 5 shows a user aiming and firing a weapon from behind an object (e.g., a wall, a cover, etc.) or from a hideout without substantially exposing himself.

Some embodiments provide that the heads-up display 180 can also provide display on top of or in addition to the camera view. Thus, for example, sensors that are part of or operatively coupled to the camera 110 and/or the handheld or wearable device (e.g., glasses 170) can be used to gather data that can be displayed on the heads-up display. In one embodiment, temperature and wind data can be sensed and displayed on the heads-up display. In another embodiment, the heads-up display 180 can show the camera view and display messages received from others in the field. The messages can be displayed over the camera view or can be separate from the camera view.

Some embodiments provide a rangefinder that is part of or operatively coupled to the camera 110 and/or the handheld or wearable device (e.g., glasses 170). The rangefinder can send range data (e.g., live-stream range data) to the heads-up display 180.

Some embodiments provide that the camera 110 can be equipped with infrared sensing or can provide an infrared light to be used at night, for example. In some embodiments, a thermal imaging system can be part of or operatively coupled to the camera 110. The infrared and/or thermal imaging camera view can then be shown on the heads-up display.

Some embodiments provide that the camera system can be employed to work with a handheld weapon such as a rifle, a gun, a bow, etc. However, some embodiments provide that the camera system can be employed in weapons or weapon systems that are not handheld. For example, the weapon can be mounted on a stand on the ground or on a stationary platform, and controlled remotely by the user. Some embodiments contemplate that the weapons can be triggered remotely. Some weapon systems contemplate weapons that are part of or mounted on vehicles (e.g., land vehicles, aircraft, amphibious vehicles, boats, etc.).

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. A camera system for use with a weapon having a weapon sight affixed to the weapon, the weapon sight providing a weapon sight view with a weapon sight aim point zeroed to an aim point of the weapon, the camera system comprising:
   a camera configured to be mounted to the weapon and capture images of a camera view of the camera;
   a display device configured to present the images of the camera view and a digital reticle over the images of the camera view;
   a manual windage adjustment configured to horizontally adjust the camera and its camera view with respect to the aim point of the weapon and independent of the weapon sight and its weapon sight aim point when the camera is mounted to the weapon;
   a manual elevation adjustment configured to vertically adjust the camera and its camera view with respect to the aim point of the weapon and independent of the weapon sight and its weapon sight aim point when the camera is mounted to the weapon; and
   wherein the manual windage adjustment and the manual elevation adjustment permit aligning the camera so that a central portion from the images of the camera view coincides with the weapon sight aim point; and
   wherein the display device is configured to adjust a location of the digital reticle independent of the weapon sight such that the presented digital reticle coincides with the central portion of the images and the weapon sight aim point.

2. The camera system according to claim 1, wherein the display device is part of a handheld system that is configured to receive the images of the camera view.

3. The camera system according to claim 1, wherein the display device is part of glasses configured to present the images of the camera view.

4. The camera system according to claim 3, wherein the glasses includes a heads-up display that presents the images of the camera view.

5. The camera system according to claim 4, wherein at least one lens of the glasses presents the images of the camera view.

6. The camera system according to claim 4, wherein the heads-up display of the glasses presents additional data over the images of the camera view.

7. The camera system according to claim 2, wherein the handheld system includes one or more processors that execute an application used to adjust the location of the digital reticle over the images of the camera view.

8. The camera system according to claim 7, wherein execution of the application causes the one or more processors to present graphical elements on the display device via which a user moves the digital reticle to over the images of the camera view aligns the digital reticle with the aim point of the weapon.

9. The camera system according to claim 2, wherein the camera communicate wirelessly with the handheld system and wirelessly provides the handheld system with the images of the camera view.

10. The camera system according to claim 1, wherein the display device is part of the camera.

11. The camera system according to claim 1, further comprising: a rangefinder operatively coupled to the display device;
   wherein the camera is configured to provide a different line of sight to the aim point of the weapon than the weapon sight of the weapon provides to the aim point;
   wherein, during a set-up procedure, the camera view shown on the display device is used to acquire a same aim point as the weapon by:
   fixing the weapon with its weapon sight directed at a first target;
   adjusting an orientation of the camera with respect to the aim point of the weapon via one or more of the manual windage adjustment and the manual elevation adjustment; and
   adjusting the location of the digital reticle on the display device to a center of the camera view;
   wherein, after the set-up procedure, the camera view does not use the weapon sight of the weapon when acquiring a second target; and wherein the display shows data from the rangefinder.

12. A weapon system comprising:
   a weapon;
   a weapon sight mounted to the weapon that provides a weapon sight view zeroed to an aim point of the weapon;
   a camera mounted to the weapon such that the camera provides a camera view with a different line of sight to the aim point of the weapon than the weapon sight view, wherein the camera is configured to capture images of the camera view;
   a display device is configured to present the images of the camera view;
   a manual windage adjustment configured to horizontally adjust the camera and its camera view with respect to the aim point of the weapon and independent of the weapon sight and its weapon sight view; and
   a manual elevation adjustment configured to vertically adjust the camera and its camera view with respect to the aim point of the weapon and independent of the weapon sight and its weapon sight view;
   wherein the manual windage adjustment and the manual elevation adjustment permit aligning the camera so that a central portion from the images of the camera view coincide with the aim point of the weapon sight view; and
   wherein the display device is configured to adjust a location of a digital reticle independent of the weapon sight such that the presented digital reticle coincides with the aim point of the weapon.

13. The weapon system of claim 12, wherein: the manual windage adjustment comprises a first turret that horizontally adjusts the camera and its camera view with respect to the aim point of the weapon when rotated; and the manual elevation adjustment comprises a second turret that vertically adjusts the camera and its camera view with respect to the aim point of the weapon when rotated.

14. The weapon system of claim 12, wherein the weapon is a handheld weapon.

15. The weapon system of claim 12, comprising a vehicle to which the weapon is mounted.

16. The weapon system of claim 12, comprising:
   a rangefinder configured to transmit range data; and
   wherein the display device is configured to display the range data received from the rangefinder along with the images received from the camera.

17. The weapon system of claim 12, comprising a stationary platform to which the weapon is mounted.

\* \* \* \* \*